United States Patent [19]

Shiraishi

[11] Patent Number: 4,665,285

[45] Date of Patent: May 12, 1987

[54] AUTOMOBILE DOOR SWITCH BUMPER

[75] Inventor: Toshiyuki Shiraishi, Hiroshima, Japan

[73] Assignee: Nifco, Inc., Yokohama, Japan

[21] Appl. No.: 779,510

[22] Filed: Sep. 24, 1985

[30] Foreign Application Priority Data

Oct. 4, 1984 [JP] Japan ............................ 59-149578[U]

[51] Int. Cl.$^4$ ............................................... H01H 9/04
[52] U.S. Cl. .................................. 200/61.62; 293/155
[58] Field of Search ................ 293/102, 155; 296/207;
403/71, 408.1; 292/337; 411/21, 41, 57;
200/61.62, 61.73, 61.76, 61.81, 61.7, 61.79,
302.1, 302.2, 333, 295; 116/86, 100

[56] References Cited

U.S. PATENT DOCUMENTS

| | | | |
|---|---|---|---|
| 851,086 | 4/1907 | Gay | 200/61.73 |
| 1,915,249 | 6/1933 | Jorgensen | 293/102 |
| 2,511,955 | 6/1950 | West | 200/61.73 |
| 2,693,588 | 11/1954 | Dawley | 200/61.62 |
| 3,659,063 | 4/1972 | Peterson | 200/61.7 |
| 3,695,652 | 10/1972 | Ratnikas | 403/71 |

Primary Examiner—Charles Frankfort
Assistant Examiner—W. Morris Worth
Attorney, Agent, or Firm—Trexler, Bushnell, Giangiorgi & Blackstone, Ltd.

[57] ABSTRACT

An automobile door switch bumper comprises a main body having a base portion, at least one hollow leg depending from the base portion and having a through-hole for receiving a pin, and a plurality of radially spaced slits defining divisions of the hollow leg and a soft peripheral wall extending upwardly from the edge of the base portion, whereby the door switch bumper is fixed on the door panel by thrusting the pin into the through-hole to radially spread the divisions.

4 Claims, 4 Drawing Figures

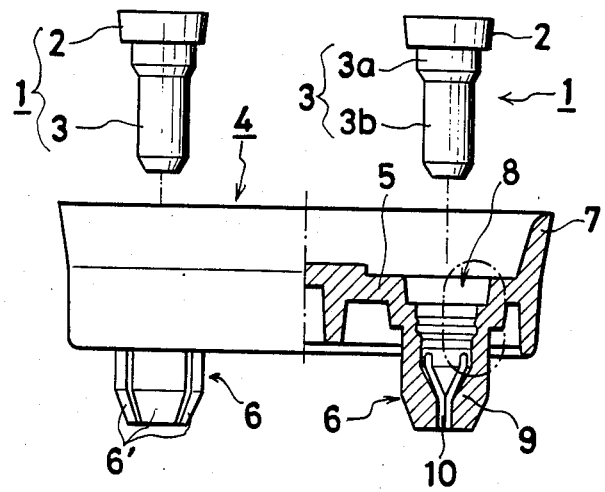
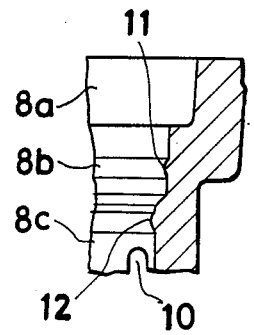
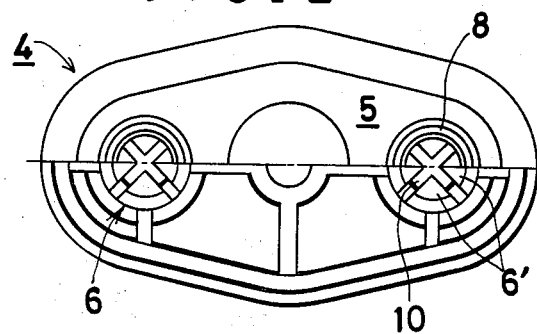
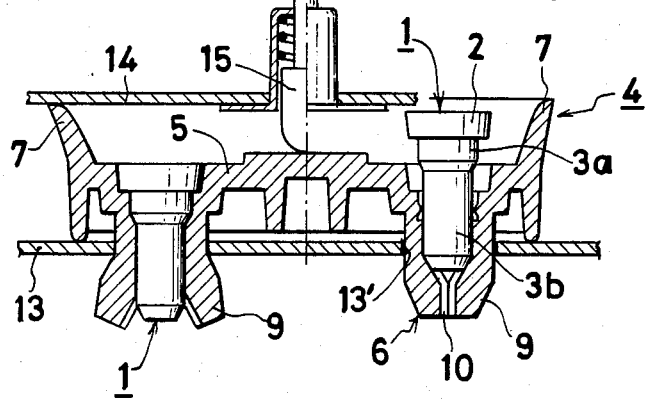

AUTOMOBILE DOOR SWITCH BUMPER

FIELD OF THE INVENTION AND RELATED ART STATEMENT

This invention relates to an automobile door switch bumper to be mounted on an automobile door panel for operating an interior lamp power circuit.

The prior art door switch bumper is made of rubber and has a solid leg having a greater diameter than the diameter of a mounting hole bored in an automobile door panel, and is mounted in the door panel by thrusting the leg into the mounting hole.

However, mounting of the door switch bumper by forcibly inserting the leg thereof into the door panel hole having a smaller diameter than the leg diameter is very time-consuming. Besides, no consideration is given to sealing property.

OBJECT AND SUMMARY OF THE INVENTION

An object of the invention is to provide an automobile door switch bumper, which can be readily mounted on a door panel and has excellent sealing property.

To attain the above object of the invention, there is provided an automobile door switch bumper which comprises a main body having a base portion; at least one hollow leg depending from the base portion and having a central through-hole; and a soft peripheral wall upwardly projecting from the edge of the base portion, and at least one pin to be inserted into the through-hole in the hollow leg for spreading the hollow leg; the hollow leg having a plurality of radially spaced slits defining divisions of the hollow leg, the divisions being spread on the back side of a door panel and engaged with the same around a hole thereof when the pin is inserted into the through-hole of the hollow leg.

When the hollow leg depending from the base portion of the main body is inserted through the door panel hole and the pin is inserted into the through-hole of the hollow leg, the divisions thereof are spread on the back side of the door panel around the hole thereof to be engaged with the back side of the door panel around the hole thereof. When the door is closed with the door switch bumper mounted in this way, the top of the base portion pushes a switch operation push rod to turn off the switch, while at the same time an upper edge portion of the peripheral wall is flexed in contact with the door panel around the push rod.

The door switch bumper thus can be easily fixed on the door panel, and also satisfactory sealing property can be ensured.

The above and other objects and features of the invention will become more apparent from the following description of a preferred embodiment thereof, which will be made in more detail with reference to the accompanying drawings.

BRIEF DESCRIPTION OF THE DRAWINGS

FIG. 1 is a side view, partly in section, showing an embodiment of the automobile door switch bumper according to the invention;

FIG. 2 is a plan view of one half and a bottom view for the other half of the main body of the same embodiment;

FIG. 3 is a fragmentary enlarged-scale sectional view showing part of the embodiment of FIG. 1; and FIG. 4 is a longitudinal sectional view of the embodiment shown in FIG. 1, showing in the right half the state in which a pin is temporarily fixed to the main body and in the left half the state in which the door switch bumper is completely secured to a door panel.

DESCRIPTION OF THE PREFERRED EMBODIMENT

The door switch bumper according to the invention will now be described with reference to the drawings.

Referring to the Figures, reference numeral 1 designates a pair of pins, each of which has a head 2 and a leg 3. The leg 3 has a large diameter portion 3a nearer the head 2 and a small diameter portion 3b having a greater length than the large diameter portion 3a. The pins 1 are made of a metal or plastic material.

Reference numeral 4 designates a main body made of rubber or plastic material having properties close to those of rubber. The main body 4 has a base portion 5, hollow legs 6 each depending from the base portion 5 and having a through-hole 8 into which the associated pin 1 is thrust, and a soft peripheral wall 7 upwardly extending from the edge of the base portion 5.

The through-hole 8 of each leg 6 has a large hollow portion 8a in which the head 2 of the pin is received when the pin is completely inserted, a medium hollow portion 8b in which the large diameter portion 3a of the pin is received, and a small hollow portion 8c in which the small diameter portion 3b of the pin is received. Each leg 6 has an end portion 9 extending beyond the small hollow portion 8c of the through-hole and having a radially increased thickness. The leg 6 has a plurality of radially spaced slits 10 extending from the thick end portion 9 to a part of the portion defining the small hollow portion 8c of the through-hole, so as to define radial sections or divisions 6'. The inner wall of the through-hole 8 has slightly inwardly projecting annular seal portions 11 and 12 provided on the medium hollow portion 8b and a part of the small hollow portion 8c near the medium hollow portion 8b. In this embodiment, the automobile door switch bumper has two legs 6. Accordingly, a door panel 13 is formed with two mounting holes 13' such that the legs 6 can be inserted through these holes.

As shown in the right half of FIG. 4, the pins 1 are first partially inserted in the through-holes such that the small diameter portion 3b of the pin is shallowly received in the small hollow portion 8c of the through-hole and is held by the seal portion 12.

To mount the door switch bumper 13, the legs 6 are thrust into the mounting holes 13' in the door panel 13, and then the pins 1 are completely inserted into the through-holes 8. As a result, the leading end of the small diameter portion 3b of each pin radially pushes open the thick end portion 9 to cause the divisions 6' thereof to spread on the back side of the door panel 13 and be engaged with the edge of the mounting hole 13' on the back side of the panel. In this state, the small and large diameter portions 3b and 3a of the pin are held by the respective seal portions 11 and 12, so that the pin is held firmly in water-tight condition.

When the door is closed, the edge portion of the peripheral wall 7 is outwardly flexed in contact with the surface of the automobile body panel 14 to water-tightly seal a push rod 15 for operating an interior lamp switch. At the same time, the top surface of the base portion 5 pushes the push rod causing it to turn off the switch of an interior lamp power circuit. The peripheral wall 7 is desirably outwardly inclined as in this embodiment.

According to the invention, it is possible to provide a door switch bumper which is of high performance and can be readily mounted on the door panel.

What is claimed is:

1. The combination comprising an automobile body panel having an aperture therein, a door switch having a push rod extending through said aperture, said push rod having a predetermined projecting length, an automobile door panel disposed adjacent to said body panel and having at least one aperture therein, and a door switch bumper comprising a body of rubber-like material having a base portion, at least one hollow leg depending from said base portion and having an axial through-hole, said leg being inserted through said door panel aperture to mount said door switch bumper on said door panel, said leg being radially deformable, a pin insertable into the through-hole of said leg to expand said leg radially to secure said leg in said door panel aperture, a soft peripheral wall projecting from the edge of said base portion, said wall being of lesser height from said base portion than the predetermined projecting length of said push rod, said wall impinging on said body panel encircling said push rod to weatherproof said push rod and said body panel aperture, and said base portion engaging and depressing said push rod.

2. A door switch bumper according to claim 1, wherein the thickness of said peripheral wall is smaller toward the upper end.

3. The combination as set forth in claim 1 wherein said wall flares upwardly and outwardly from said base.

4. The combination as set forth in claim 1 wherein said base includes a transverse wall engageable with said push rod and supporting means beneath said wall to prevent deflection thereof.

* * * * *